United States Patent
Wang

(10) Patent No.: US 9,201,530 B2
(45) Date of Patent: Dec. 1, 2015

(54) TOUCH PANEL HAVING CONDUCTIVE PARTICLE LAYER

(71) Applicant: HengHao Technology Co. LTD, Taoyuan County (TW)

(72) Inventor: Cheng-Kai Wang, Taoyuan County (TW)

(73) Assignee: Henghao Technology Co. Ltd., Taoyuan County (TW)

( * ) Notice: Subject to any disclaimer, the term of this patent is extended or adjusted under 35 U.S.C. 154(b) by 86 days.

(21) Appl. No.: 14/070,861

(22) Filed: Nov. 4, 2013

(65) Prior Publication Data

US 2015/0055029 A1 Feb. 26, 2015

(30) Foreign Application Priority Data

Aug. 22, 2013 (TW) .............................. 102130018 A

(51) Int. Cl.
 *G06F 3/045* (2006.01)
 *G06F 3/041* (2006.01)
 *G06F 3/044* (2006.01)

(52) U.S. Cl.
 CPC ................ *G06F 3/041* (2013.01); *G06F 3/044* (2013.01); *G06F 2203/04103* (2013.01)

(58) Field of Classification Search
 CPC .......... G06F 2203/04103; G06F 3/041; G06F 3/044; G06F 2230/04111; G06F 2203/04112
 USPC ..................... 345/173–179; 178/18.01–18.09, 178/20.01–20.04
 See application file for complete search history.

(56) References Cited

U.S. PATENT DOCUMENTS

| | | | | |
|---|---|---|---|---|
| 7,785,496 B1 * | 8/2010 | Shim et al. | ..................... | 252/500 |
| 8,581,880 B2 * | 11/2013 | Kuo | .............................. | 345/174 |
| 8,698,029 B2 * | 4/2014 | Scuderi et al. | ................ | 200/600 |
| 8,810,528 B2 * | 8/2014 | Bita et al. | ....................... | 345/173 |
| 2002/0180688 A1 * | 12/2002 | Drzaic et al. | ................... | 345/107 |
| 2009/0002337 A1 * | 1/2009 | Chang | ............................ | 345/174 |
| 2009/0135326 A1 * | 5/2009 | Ono et al. | ......................... | 349/46 |
| 2014/0313159 A1 * | 10/2014 | Wilson et al. | ................. | 345/174 |
| 2014/0347578 A1 * | 11/2014 | Yamada et al. | .................. | 349/12 |

FOREIGN PATENT DOCUMENTS

| | | |
|---|---|---|
| JP | 2013-073449 A | 4/2013 |
| KR | 20010096667 A | 11/2001 |
| KR | 20130056003 A | 5/2013 |

* cited by examiner

*Primary Examiner* — Vijay Shankar
(74) *Attorney, Agent, or Firm* — Donald E. Stout; Stout, Uxa & Buyan, LLP

(57) ABSTRACT

A touch panel includes first electrodes, second electrodes, first conductive lines, second conductive lines and a conductive particle layer. The first and second electrodes are respectively formed on an upper surface of a first transparent substrate and a bottom surface of a second transparent substrate. The upper surface is adhered to the bottom surface. The first and second conductive lines are formed on a periphery area of the upper surface, and the first conductive lines are electrically connected to the first electrodes. The conducting particle layer, disposed between the first and the second transparent substrate, includes conducting particles, which are electrically connected to the second conductive lines and the second electrodes.

15 Claims, 3 Drawing Sheets

TOUCH PANEL HAVING CONDUCTIVE PARTICLE LAYER

BACKGROUND OF THE INVENTION

1. Field of the Invention

The present invention generally relates to a touch panel, and more particularly to a touch panel having a double-layer electrode structure.

2. Description of Related Art

Touch screens are input/output devices which adopt sensing technology and display technology, and which have been widely employed in electronic devices such as portable or hand-held electronic devices.

A capacitor-based touch panel is a commonly used touch panel that utilizes a capacitive coupling effect to detect touch position. Specifically, capacitance corresponding to the touch position changes and is thus detected, when a finger touches a surface of the touch panel.

Referring to FIG. 1A and FIG. 1B, FIG. 1A shows a cross-sectional view of a conventional touch panel 100 and FIG. 1B shows a manufacturing process of the conventional touch panel 100. As shown in FIG. 1A and FIG. 1B, a plurality of first electrodes 112 are disposed on an upper surface of a first substrate 110, and a plurality of second electrodes 122 are disposed on a bottom surface of a second substrate 120. Further, the upper surface of the first substrate 110 is adhered to the bottom surface of the second substrate 120 by an optically clear adhesive layer 130, wherein the first electrodes 112 and the second electrodes 112 could be orthogonal to each other.

In the conventional touch panel 100 mentioned above, a plurality of first conductive lines 114 and a plurality of second conductive lines 124 must be respectively formed on periphery areas of the upper surface of the first substrate 110 and the bottom surface of the second substrate 120 by screen printing process or yellow light manufacturing process, such that the first conductive lines 114 and the second conductive lines 124 are electrically connected to the first electrodes 112 and the second electrodes 122 respectively, in order to transmit sensing signals of the touch position. However, the design and manufacturing process of the conductive lines in the conventional touch panel are complicated, often resulting in high manufacturing costs and low productivity.

A need has thus arisen to propose a novel touch panel to overcome deficiencies of the conventional touch panels.

SUMMARY OF THE INVENTION

In view of the foregoing, it is an object of the embodiment of the present invention to provide a touch panel with a configuration design of the conductive lines to simplify process, reduce manufacturing cost and increase productivity.

According to one embodiment, a touch panel includes a plurality of first electrodes, a plurality of second electrodes, a plurality of first conductive lines, a plurality of second conductive lines and a conductive particle layer. The first electrodes are formed on an upper surface of a first transparent substrate. The second electrodes are formed on a bottom surface of a second transparent substrate. Further, the upper surface of the transparent substrate is adhered to the bottom surface of the second transparent substrate, and the first electrodes are insulated to the second electrodes. The first conductive lines and the second conductive lines are all formed on a periphery area of the upper surface of the first transparent substrate, wherein the first conductive lines are electrically connected to the first electrodes. The conductive particle layer is disposed between the first transparent substrate and the second transparent substrate, and the conductive particle layer has a plurality of conductive particles, configured to be electrically connected to the second conductive lines and the second electrodes.

DETAILED DESCRIPTION OF THE INVENTION

Figure 1A:
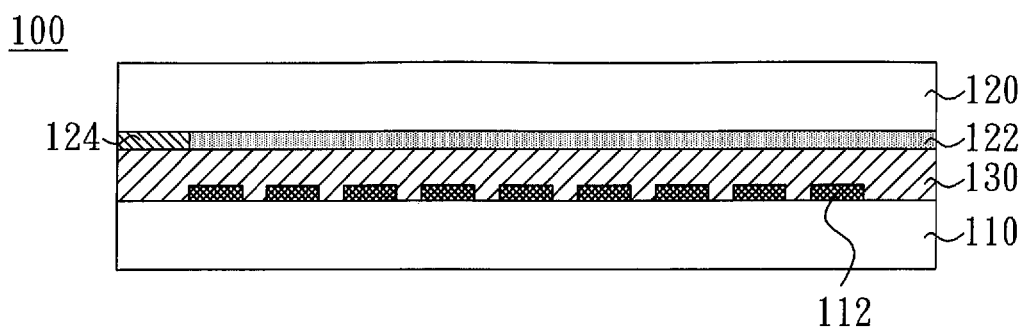
FIG. 1A shows a cross-sectional view of a conventional touch panel.
Figure 1B:
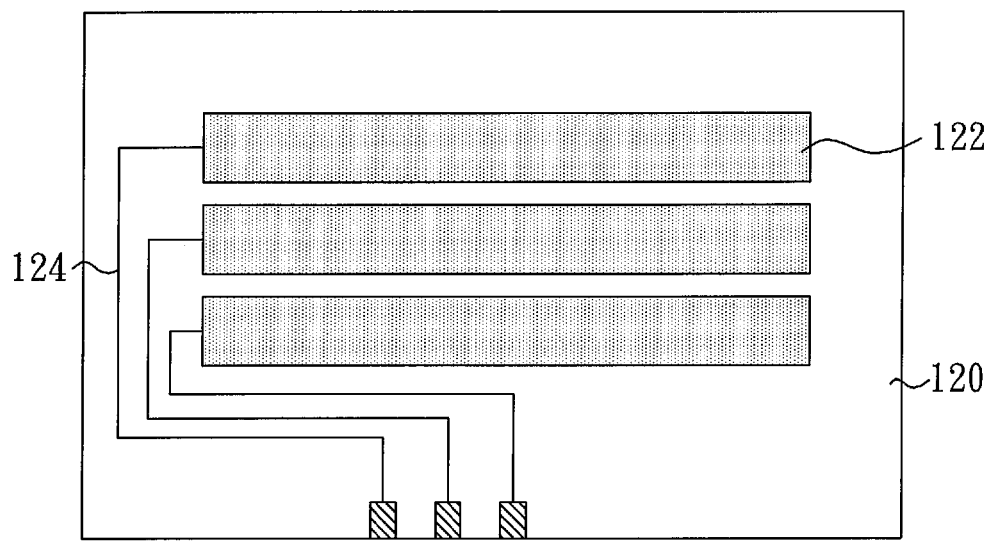
FIG. 1B shows a manufacturing view of the conventional touch panel.
Figure 1B:
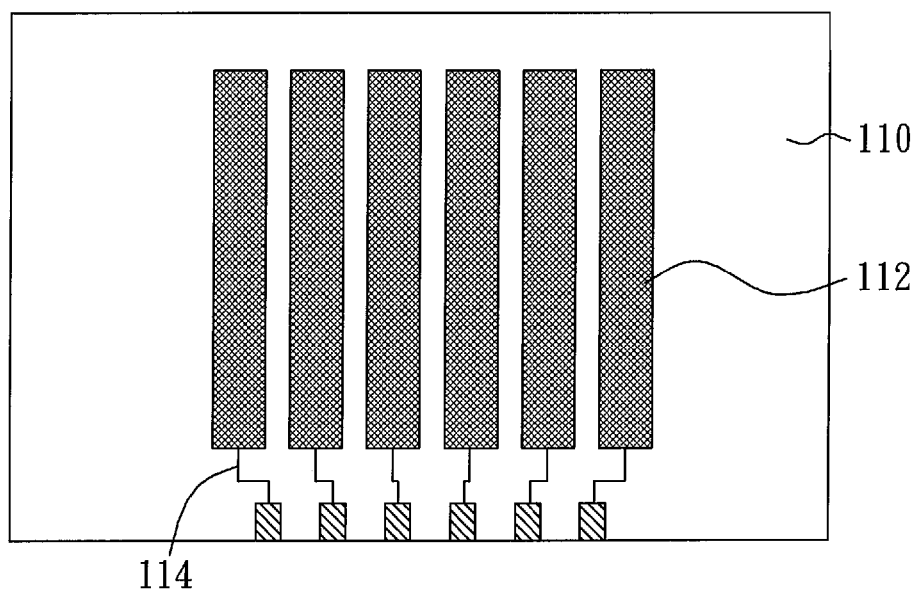
Figure 2A:
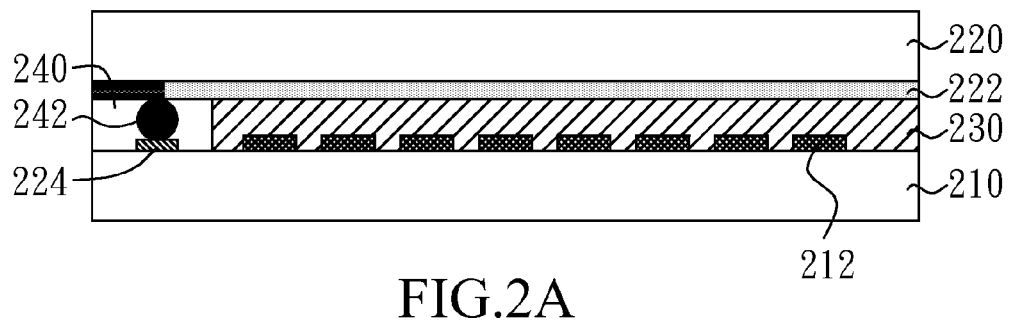
FIG. 2A shows a cross-sectional view of a touch panel according to an embodiment of the present invention.
Figure 2B:
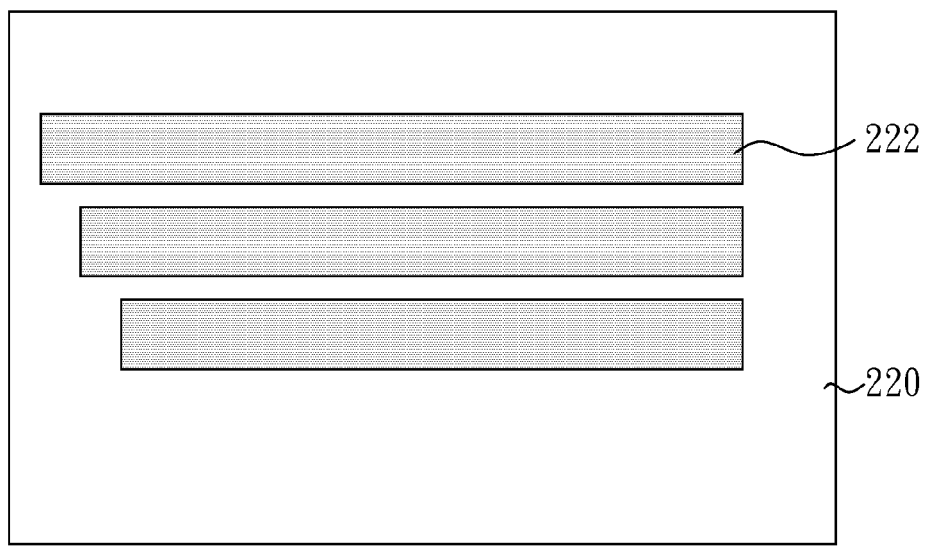
FIG. 2B shows a manufacturing view of the touch panel in FIG. 2A.
Figure 2B:
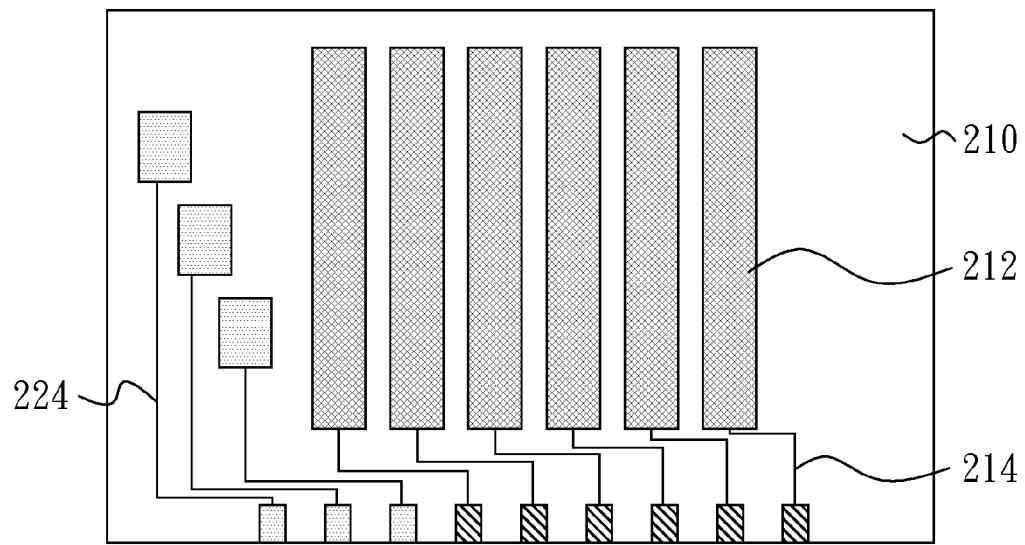

Referring to FIG. 2A and FIG. 2B, FIG. 2A shows a cross-sectional view of a touch panel according to an embodiment of the present invention, and FIG. 2B shows a manufacturing view of the touch panel in FIG. 2A.

The touch panel 200 in this embodiment includes a plurality of first electrodes 212, a plurality of second electrodes 222, a plurality of first conductive lines 214, a plurality of second conductive lines 224 and a conductive particle layer 240. The first electrodes 212 are formed on an upper surface of a first transparent substrate 210, and the first electrodes 212 are disposed in parallel in a first direction. The second electrodes 222 are formed on a bottom surface of a second transparent substrate 220, and the second electrodes 222 are disposed in parallel in a second direction. The first direction and the second direction are substantially orthogonal to each other. The upper surface of the first transparent substrate 210 is adhered to the bottom surface of the second transparent substrate 220, and the first electrodes 212 are insulated to the second electrodes 222. In one embodiment, the touch panel 200 further includes an optically clear adhesive layer 230, which is disposed between the first transparent substrate 210 and the second transparent substrate 220. Specifically, an upper surface and a bottom surface of the optically clear adhesive layer 230 are respectively adhered to the first electrodes 212 and the second electrodes 222.

The first transparent substrate 210 and the second transparent substrate 220 may include insulating material such as glass, Polycarbonate (PC), Polyethylene terephthalate (PET), Polyethylen (PE), Poly vinyl chloride (PVC), Poly propylene (PP), Poly styrene (PS), Polymethyl methacrylate (PMMA) or Cyclic olefin copolymer (COC).

As shown in FIG. 2A/2B, the first conductive lines 214 are formed on a periphery area of the upper surface of the first transparent substrate 210, wherein an end of each first conductive line 214 is electrically connected to an end of the corresponding first electrode 212. The second conductive lines 224 are also formed on the periphery area of the upper surface of the first transparent substrate 210. Making use of the layout and configuration of the conductive lines mentioned above, the first conductive lines 214 and the second conductive lines 224 can simultaneously be formed on the first transparent substrate 210 by screen printing process or yellow light manufacturing process, so as to simplify manufacturing process of touch panel 200.

Moreover, the conductive particle layer 240 is disposed between the first transparent substrate 210 and the second transparent substrate 220. The conductive particle layer 240 has a plurality of conductive particles 242. Each conductive particle 242 is configured to be electrically connected to both of an end of the second conductive line 224 and an end of the corresponding second electrode 222. Further, a diameter of the conductive particle 242 is equal to or greater than a gap between the second electrode 222 and the second conductive line 224, such that the second electrodes 222 may be substantially electrically connected to the conductive particles 242 without user's pressing action, and the sensing signals of touch position detected by the second electrodes 222 can be transmitted by the conductive particles 242 and the second conductive lines 224 for signal processing. In this embodiment, the conductive particles 242 may be metal particles, such as gold, silver, carbon, zinc, indium tin oxide (ITO) particles or a combination thereof.

In another embodiment, the conductive particle layer 240 may further include a frame sealing adhesive or an optically clear adhesive, and the conductive particles 242 are doped in the frame sealing adhesive or the optically clear adhesive. Therefore, after the second conductive lines 224 are formed on the first transparent substrate 210 by screen printing process or yellow light manufacturing process, an end of each second conductive line 224 may be electrically connected to at least one conductive particle 242 by adhering the frame sealing adhesive or the optically clear adhesive, which contains the conductive particles 242, to the second conductive lines 224.

In another embodiment, the conductive particle layer 240 may be a conductive tape, and the conductive particles 242 are uniformly distributed in the conductive tape. Thus, after second conductive lines 224 are formed on the first transparent substrate 210, an end of each second conductive line 224 may be electrically connected to at least one conductive particle 242 by adhering the conductive tape to the second conductive lines 224. Consequently, after the first transparent substrate 210 and the second transparent substrate are adhered to each other, the first electrodes 212 can transmit sensing signals to the first conductive lines 224 disposed on the first transparent substrate 210 by the conductive particles 242.

Furthermore, the first electrodes 212 and the second electrodes 222 mentioned above may include a conductive material such as indium tin oxide (ITO), grapheme, Al-doped ZnO (AZO), zinc oxide (ZnO), antimony tin oxide (ATO), Ga Doped ZnO (GZO), F Doped SnO2 (FTO) or a combination thereof.

In another embodiment, the first electrodes 212 and the second electrodes 222 may include a light-transmissive structure made of a non-transparent material. The non-transparent material may include metal nanowires (e.g., silver nanowires or copper nanowires) or metal nanonets (e.g., silver nanonets or copper nanonets). The metal nanowires or nanonets have a diameter in a nanometer order (i.e., a few nanometers to hundreds nanometers), and may be fixed via a plastic material (e.g., resin).

Due to fineness of the metal nanowires/nanonets unobservable to human eyes, the first electrodes 212 and the second electrode 222 made of the metal nanowires/nanonets thus have high light-transmittance and reduce the overall thickness of the touch panel 200. The metal nanowires/nanonets are interleaved with each other and flatly distributed, therefore each of the first electrode 212 and the second electrode 222 made of the metal nanowires/nanonets therefore has an isotropic conductivity, which is substantially invariant with respect to direction.

According to another aspect of this embodiment the first electrodes 212 and the second electrodes 222 may also include a photosensitive material (e.g., acrylic), through which the first electrodes 212 and the second electrodes 222 with a required pattern may be formed via an exposure development process.

Figure 2C:
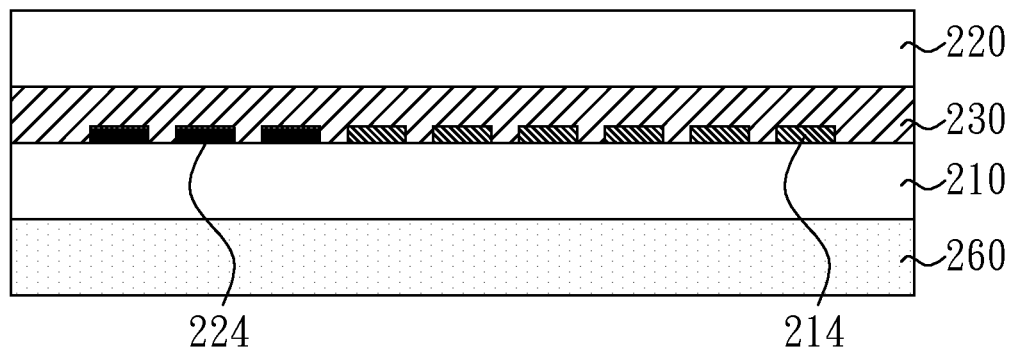
FIG. 2C shows a top view of a touch panel according to another embodiment of the present invention.

Referring to FIG. 2C, FIG. 2C shows a cross-section view of a touch panel 200 according to another embodiment of the present invention. As shown in FIG. 2C, the first conductive lines 214 and another end of each second conductive line 224 are all disposed on the same side of the touch panel 200, so that a flexible printed circuit (FCP) bonding process may proceed accordingly, and the sensing signal which is detected by the touch panel 200 may be transmitted to the FCP through the first conductive lines 214 and the second conductive lines 224 for signal processing.

Although the transparent substrate in FIG. 2C is illustrated with two-dimensional profile, however the present invention is not limited thereto. The transparent substrate of present invention may have a two-dimensional or three-dimensional profile, which may be applied to a two-dimensional or a three-dimensional touch display respectively. In another embodiment, the transparent substrate may also include flexible material or rigid material, and the surface material of the transparent substrate may be processed to have anti-wear, anti-scratch, anti-reflection, anti-glare and anti-fingerprint features.

Moreover, the touch panel 200 may further include a protective film 260, which is disposed on a bottom surface of the first transparent substrate 210, for covering the first transparent substrate 210 and providing a protection.

Although specific embodiments have been illustrated and described, it will be appreciated by those skilled in the art that various modifications may be made without departing from the scope of the present invention, which is intended to be limited solely by the appended claims.

What is claimed is:

1. A touch panel, comprising:
 a plurality of first electrodes formed on an upper surface of a first transparent substrate;
 a plurality of second electrodes formed on a bottom surface of a second transparent substrate, wherein the upper surface of the first transparent substrate is adhered to the bottom surface of the second transparent substrate, and the first electrodes are insulated to the second electrodes;
 a plurality of first conductive lines formed on a periphery area of the upper surface of the first transparent substrate, wherein an end of each first conductive line is electrically connected to one of the first electrodes;
 a plurality of second conductive lines formed on the periphery area of the upper surface of the first transparent substrate; and
 a conductive particle layer disposed between the first transparent substrate and the second transparent substrate, wherein the conductive particle layer has a plurality of conductive particles, configured to be electrically connected to the second conductive lines and the second electrodes.

2. The touch panel of claim 1, wherein each of the first transparent substrate and the second transparent substrate comprises glass, Polycarbonate (PC), Polyethylene terephthalate (PET), Polyethylen (PE), Poly vinyl chloride (PVC), Poly propylene (PP), Poly styrene (PS), Polymethyl methacrylate (PMMA) or Cyclic olefin copolymer (COC).

3. The touch panel of claim 1, further comprising an optically clear adhesive layer disposed between the first transparent substrate and the second transparent substrate, wherein the optically clear adhesive layer is adhered to the first electrodes and the second electrodes.

4. The touch panel of claim 1, wherein a diameter of each conductive particle is equal to or greater than a gap between the second electrode and second conductive line.

5. The touch panel of claim 1, wherein the conductive particles are gold, silver, carbon, zinc, indium tin oxide (ITO) particles or a combination thereof.

6. The touch panel of claim 1, wherein the conductive particle layer further includes a frame sealing adhesive or an optically clear adhesive.

7. The touch panel of claim 1, wherein the conductive particle layer is a conductive tape.

8. The touch panel of claim 1, wherein each of the first electrodes and the second electrodes includes a conductive material, and the conductive material comprises indium tin oxide (ITO), grapheme, Al-doped ZnO (AZO), zinc oxide (ZnO), antimony tin oxide (ATO), Ga Doped ZnO (GZO), F Doped SnO2 (FTO) or a combination thereof.

9. The touch panel of claim 1, wherein each of first electrodes and the second electrodes includes a light-transmissive structure made of a non-transparent material.

10. The touch panel of claim 9, wherein the non-transparent material comprises metal nanowires or metal nanonets.

11. The touch panel of claim 10, wherein the metal wire or the metal nanonet has a diameter of some nanometers to hundreds of nanometers.

12. The touch panel of claim 10, wherein the metal wires or the metal nanonets are flatly distributed.

13. The touch panel of claim 10, wherein the first electrodes and the second electrodes further comprise plastic material, for fixing the non-transparent conductive material in the first electrodes and the second electrodes.

14. The touch panel of claim 1, wherein the first electrodes and the second electrodes further comprise photoresistive material.

15. The touch panel of claim 1, further comprising a protective film disposed on a bottom surface of the first transparent substrate.

\* \* \* \* \*